(12) United States Patent
Hicks et al.

(10) Patent No.: US 8,632,651 B1
(45) Date of Patent: Jan. 21, 2014

(54) PLASMA SURFACE TREATMENT OF COMPOSITES FOR BONDING

(75) Inventors: Robert F. Hicks, Los Angeles, CA (US); Steve Babayan, San Jose, CA (US)

(73) Assignee: Surfx Technologies LLC, Redondo Beach, CA (US)

( * ) Notice: Subject to any disclaimer, the term of this patent is extended or adjusted under 35 U.S.C. 154(b) by 952 days.

(21) Appl. No.: 11/770,494

(22) Filed: Jun. 28, 2007

Related U.S. Application Data

(60) Provisional application No. 60/806,032, filed on Jun. 28, 2006.

(51) Int. Cl.
*B29C 65/00* (2006.01)

(52) U.S. Cl.
USPC .................................................. 156/272.2

(58) Field of Classification Search
USPC ................. 156/272.2, 272.6, 275.7
See application file for complete search history.

(56) References Cited

U.S. PATENT DOCUMENTS

| | | | |
|---|---|---|---|
| 3,437,864 A | | 4/1969 | Kofoid et al. |
| 4,088,926 A | | 5/1978 | Fletcher et al. |
| 4,133,789 A | * | 1/1979 | Lakshmanan ................. 156/322 |
| 4,434,742 A | | 3/1984 | Henaff et al. |
| 5,147,493 A | | 9/1992 | Nishimura et al. |
| 5,198,724 A | | 3/1993 | Koinuma et al. |
| 5,285,046 A | | 2/1994 | Hansz |
| 5,309,063 A | | 5/1994 | Singh |
| 5,414,324 A | | 5/1995 | Roth et al. |
| 5,789,867 A | | 8/1998 | Westendorp et al. |
| 5,876,510 A | * | 3/1999 | Kuemin et al. ................. 134/12 |
| 5,961,772 A | | 10/1999 | Selwyn |
| 5,977,715 A | | 11/1999 | Li et al. |
| 5,997,956 A | | 12/1999 | Hunt et al. |
| 6,204,605 B1 | | 3/2001 | Laroussi et al. |
| 6,262,523 B1 | | 7/2001 | Selwyn et al. |
| 6,416,633 B1 | * | 7/2002 | Spence ......................... 204/156 |
| 6,465,964 B1 | | 10/2002 | Taguchi et al. |

(Continued)

FOREIGN PATENT DOCUMENTS

DE    10115241 A1 * 10/2002

OTHER PUBLICATIONS

Machine Translation of DE 10115241 A1, Aug. 12, 2010.*
Inomata et al., Open air deposition of SiO2 film from a cold plasma torch of tetramethoxysilane-H2-Ar system, Appl. Phys. Lett., Jan. 3, 1994, pp. 46-47, 64(1).
Koinuma et al., Development and application of a microbeam plasma. generator, Appl. Phys. Lett., Feb. 17, 1992, pp. 816-817, 60(7).

*Primary Examiner* — Daniel McNally
(74) *Attorney, Agent, or Firm* — Canady & Lortz LLP; Bradley K. Lortz

(57) ABSTRACT

A method for bonding composites together that is fast and effective, and can be applied to any structure regardless of its size and shape, and its related product are disclosed. The method comprises first subjecting at least a part of a composite work piece to a low-temperature, atmospheric pressure plasma, wherein the reactive gas from the plasma is projected out of the device and onto the surface of the composite work piece, then applying an adhesive to the surface of the treated composite work piece, and joining the composite work piece together with a second work piece. The adhesive may be cured such that it forms a strong, permanent bond. The atmospheric plasma delivery device may be translated over the composite surface by hand or with a robot. The plasma device may be self-contained and portable, and can be moved to a location that is convenient for treating the composites.

15 Claims, 3 Drawing Sheets

(56) References Cited

U.S. PATENT DOCUMENTS

| | | |
|---|---|---|
| 6,659,110 B2 | 12/2003 | Fornsel et al. |
| 6,730,238 B2 | 5/2004 | Li et al. |
| 6,821,379 B2 * | 11/2004 | Datta et al. ............... 156/345.43 |
| 6,923,890 B2 | 8/2005 | Ricatto et al. |
| 2001/0006093 A1 | 7/2001 | Tabuchi et al. |
| 2002/0008480 A1 | 1/2002 | Yamazaki et al. |
| 2002/0081921 A1 * | 6/2002 | Vargo et al. ............... 442/16 |
| 2002/0129902 A1 | 9/2002 | Babayan et al. |
| 2006/0156983 A1 | 7/2006 | Penelon et al. |
| 2007/0095457 A1 * | 5/2007 | Keller et al. ............... 156/94 |

* cited by examiner

PLASMA SURFACE TREATMENT OF COMPOSITES FOR BONDING

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 60/806,032, filed Jun. 28, 2006, and entitled "PLASMA SURFACE TREATMENT OF COMPOSITES FOR BONDING", by Robert Hicks et al.

STATEMENT OF GOVERNMENT RIGHTS

This invention was made with Government support under contract No. FA8650-05-C-5602 awarded by the United States Air Force. The Government has certain rights in this invention.

BACKGROUND OF THE INVENTION

1. Field of the Invention

The invention is related to a method of bonding composite structures together by means of treating the composite surfaces with an atmospheric plasma, followed by applying adhesive to one of the surfaces, joining the composites together, and curing said adhesive.

2. Description of the Related Art

Composite materials are used in the aerospace, automotive, electronics, medical and sports equipment industries because of their unique properties (M. M. Schwartz, "Post Processing of Composites," *Society for the Advancement of Materials and Process Engineering*, Covina, Calif. 1996). They are lightweight, exceptionally strong, chemically and thermally stable, and can be processed into a wide variety of shapes. Their high strength to weight ratio makes them especially attractive for use in aircraft, where by replacing the metal structures, they can reduce the weight of the vehicle and dramatically save on fuel costs.

A composite is composed of a reinforcement and a matrix material (M. M. Schwartz, ibid.). The reinforcement may be fibers, whiskers, platelets, flakes, and other shapes. Fibers are the most common, and among these glass, graphite and aramid fibers are widely used. Matrix materials may be thermosetting or thermoplastic polymers, metals, or ceramics. Polymers are attractive because they are strong and lightweight, thermally and chemically stable, and are conveniently processed into desired structures. Thermosetting resins react at elevated temperature to produce three dimensional crosslinked networks. Once reacted, thermosets remain fixed in shape, and cannot be reprocessed. Thermosets comprise polyesters, epoxy resins, phenolic resins, bismaleimides and polyimides. Thermoplastics are polymers that do not chemically react when heated. Instead they may be melted and formed into engineered structures, and can be reprocessed if desired. They offer the potential of being tougher and more stable than thermosets. Examples of thermoplastic matrix materials include, but are not limited to, polyethersulfone (PES), polyetherimide (PEI), polyether-etherketone (PEEK), and polyetherketoneketone (PEKK).

Carbon-fiber-reinforced PEEK is an especially attractive composite. PEEK is an aromatic polymer that has excellent mechanical strength, and high resistance to fatigue, impact and abrasion. It is also fire resistant and a good electrical insulator (J. Jang and H. Kim, *Polymer Composites*, Vol. 18, p. 125 (1997); and M. M. Schwartz, ibid.). In the medical industry, PEEK is an attractive material for implants due to its biocompatibility. In the aerospace and automotive industries, metal structures are being replaced by carbon-fiber-reinforced PEEK, because of its superior mechanical properties and high strength-to-weight ratio.

Although carbon-fiber-reinforced composites have attractive properties for use in many engineered products, they suffer from a major drawback in that these materials often do not adhere well to other surfaces. Without specialized surface treatments, composites may not form strong bonds to epoxy resins (Schwartz, ibid.). This is especially true of thermoplastics, such as PES, PEI, PEEK and PEKK. Adhesives and surface preparation methods designed for other composites do not provide sufficiently strong bonds, so that under a relatively low shearing force they undergo adhesive failure with the glue separating cleanly from the polymer surface. Therefore to use these materials in aircraft and other structures, the thermoplastic composites must be bolted together. This approach produces a weaker structure, and increases the total weight of the aircraft.

Many methods have been examined for treating polymer composites prior to adhesive bonding. These include bead blasting, wet chemical etching, flame oxidation, UV/ozone treatment, argon ion bombardment, and oxygen plasma etching (M. M. Schwartz, ibid.). Among these methods, oxygen plasma treatment has been found to be the most effective at increasing the bond strength of epoxy adhesives to thermosetting and thermoplastic composites. N. Inagaki and coworkers, ("Surface modification of poly (aryl ether ether ketone) film by remote oxygen plasma," *Journal of Applied Polymer Science*, Vol. 68, p. 271 (1998)) describe the treatment of PEEK with a low-pressure oxygen plasma operated at 0.13 Pascal. After exposing the PEEK film for 30 s, the water contact angle dropped from 93 to about 60 degrees. J. Comyn, et al. ("Corona discharge treatment of polyetheretherketone (PEEK) for adhesive bonding," *Intl. Journal of Adhesion and Adhesives*, Vol. 16, p. 97 (1996)) subjected PEEK film to an oxygen plasma for 60 s at 40 Pascal. These authors observed a decrease in the water contact angle. After bonding samples together with epoxy adhesive, they found that the plasma treatment yielded a large increase in peel strength and a doubling of the lap shear strength over untreated samples.

One of the disadvantages of oxygen plasmas used in the prior art is that they were generated in a vacuum (M. M. Schwartz, ibid.). To receive treatment the composite parts must be inserted into a sealed chamber and the gas pumped away prior to striking the discharge. This approach limits the size and shape of parts that can be treated, since they must fit inside the chamber. Moreover, vacuum operation requires expensive equipment that must be maintained, is more time consuming, and more expensive than atmospheric pressure processes.

The use of atmospheric pressure plasmas to treat polymer composites has been described in the prior art. In particular, coronas and dielectric barrier discharges have been used to treat polymers for increased wettability and surface adhesion (see for example, P. J. Ricatto, et al., "Chemical processing using non-thermal discharge plasma," U.S. Pat. No. 6,923,890, Aug. 2, 2005; L. A. Rosenthal and D. A Davis, "Electrical Characterization of a Corona Discharge for Surface Treatment," IEEE Transaction on Industry Applications, Vol. 1A-11, p. 328 (1975); and J. Comyn, et al., "Corona-discharge treatment of polyether-etherketone (PEEK) for adhesive bonding," *Intl. Journal of Adhesion and Adhesives*, Vol. 16, p. 301 (1996)). The latter authors showed an approximate doubling of the lap shear strength following corona treatment, similar to what was achieved with the vacuum oxygen plasma. Nevertheless, the dielectric barrier discharge and the corona generate the atmospheric pressure plasma between two closely spaced electrodes separated by a dielectric spacer. In order to treat the composite, it must be in the form of a flexible film less than 1.0 mm thick, so that it can be fed between the two electrodes. This design severely restricts the type of composite materials that can be treated, and is not applicable to composites that have been formed into rigid three-dimensional shapes, such as those used in the structure of an aircraft.

Therefore, there is a need for a method of adhesively bonding a composite work piece of any size and shape that utilizes an effective surface treatment of the material, so that when the part is joined with another work piece, they form a strong, permanent bond. In particular, there is a need for a method of adhesively bonding a composite work piece where an atmospheric pressure plasma is used for surface treatment, such that the plasma can be conveniently applied to the surface of any composite structure, regardless of its size and shape, and after treatment and application of the adhesive a strong, permanent bond is obtained. As described hereafter, these and other needs are met by embodiments of the present invention.

SUMMARY OF THE INVENTION

To overcome the limitations in the prior art described above, a method for bonding composites together that is fast and effective, and can be applied to any structure regardless of its size and shape, and its related product are disclosed. The method comprises first subjecting at least a part of a composite work piece to a low-temperature, atmospheric pressure plasma, wherein the reactive gas from the plasma flows out of the device and onto the surface of the composite work piece, then applying an adhesive to the surface of the treated composite work piece, and joining the composite work piece together with a second work piece. The adhesive may be cured such that it forms a strong, permanent bond. The method further comprises using an atmospheric pressure plasma to treat at least a part of the surfaces of the composite work piece, thereby activating the surface for adhesive bonding, wherein the atmospheric pressure plasma is generated in a atmospheric plasma delivery device that can be translated over a composite surface by hand or with a robot. The method further comprises using a self-contained atmospheric pressure plasma delivery device to treat a composite surface thereby activating it for adhesive bonding, wherein said plasma device is portable, and can be moved to a location that is convenient for treating the composites structure.

A typical embodiment of the invention comprises a method of bonding a composite, including the steps of exposing a surface of a composite work piece to a reactive gas beam from an atmospheric pressure plasma delivery device, applying adhesive to at least portion of the surface after exposure to the reactive gas beam, and joining the composite work piece to a second work piece with the applied adhesive. The atmospheric pressure plasma delivery device projects the reactive gas beam exterior to the atmospheric pressure plasma delivery device from a head. The projected reactive gas beam may comprise a reactive oxygen species. The head of the atmospheric pressure plasma delivery device can disperse the reactive gas beam through a plurality of holes. Typically, the atmospheric pressure plasma delivery device generates the reactive gas beam by application of radio-frequency power across at least a pair of electrodes with a gas flowing between the pair of electrodes to become the reactive gas beam. For example, the radio frequency power may be at least 50 W applied at a frequency selected from the group consisting of approximately 13.56 MHz and 27.12 MHz.

The atmospheric pressure plasma delivery device may be a self-contained that projects the reactive gas beam into an ambient atmospheric pressure environment. The head of the atmospheric pressure plasma delivery device may be maneuverable so that the reactive gas beam may be directed where desired. For example, the head of the atmospheric pressure plasma delivery device may be translated over the composite work piece at a rate from 0.5 inches per minute to 1.0 foot per second to expose the surface to the reactive gas beam. In some embodiments, the head of the atmospheric pressure plasma delivery device is translated over the composite work piece by hand. Alternately, the head of the atmospheric pressure plasma delivery device may be translated over the composite work piece by a robotic arm. Further, the composite work piece may comprise an aerospace structure. Particularly, at least one of the composite work piece and the second work piece comprises a damaged component of the aerospace structure.

In further embodiments, a second surface of the second work piece may be exposed to the projected reactive gas beam from the atmospheric pressure plasma delivery device before joining the composite work piece and the second work piece. In addition, the adhesive may be cured to form a strong bond between the composite work piece and the second work piece. Curing the adhesive may comprises applying an elevated temperature environment for a sufficient time. In addition, the surface of the composite work piece may be cleaned with an organic solvent and drying prior to exposure with the reactive gas beam.

Typically, at least one of the composite work piece and the second work piece comprises a polymer selected from the group consisting of polyester, phenolic resin, bismaleimide, polyimide, polyethersulfone, polyetherimide, polyetheretherketone, polyetherketoneketone, and a fiber reinforcement selected from the group consisting of carbon fibers and glass fibers. However, the second work piece may be a second material selected from the group consisting of a composite (e.g. any of the foregoing composite materials), a metal, and a ceramic.

Another embodiment of the invention comprises a composite assembly, produced with a bonding process by the steps of exposing a surface of a composite work piece to a reactive gas beam from an atmospheric pressure plasma delivery device, applying adhesive to at least portion of the surface after exposure to the reactive gas beam, and joining the composite work piece to a second work piece with the applied adhesive. Here also, the atmospheric pressure plasma delivery device projects the reactive gas beam exterior to the atmospheric pressure plasma delivery device from a head. Typically, a bond between the composite work piece and the second work piece comprises a bond strength determined by cohesive failure. The composite assembly may be an aerospace structure assembled in an ambient environment and in some cases at least one of the composite work piece and the second work piece comprises a damaged component of the aerospace structure. In addition, the bonding process may also include exposing a second surface of the second work piece to the projected reactive gas beam from the atmospheric pressure plasma delivery device before joining the composite work piece and the second work piece. Further, the bonding process may include curing the adhesive to form a strong bond between the composite work piece and the second work piece.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration the specific embodiment in which the invention may be practiced. It is to be understood that other embodiments may be utilized and structural and functional changes may be made without departing from the scope of the present invention.

A method of bonding composites to each other and to other materials utilizing a self-contained, atmospheric pressure plasma device, in which the steps comprise treating the surface of at least one composite with the atmospheric plasma for a time sufficient to activate said surface, applying adhesive to one of the surfaces, joining the materials together, and curing the adhesive. The method of bonding composites together may be applied to aerospace (e.g., aircraft) and other transportation vehicles, where at least one composite surface is treated with a self-contained atmospheric pressure plasma, adhesive is applied to said treated surface, the composite is joined to another composite or other material, and the adhesive is cured to form a strong, permanent bond.

The many advantages and novel features that characterize embodiments of the invention are described in the matter presented below. Reference should be made to the drawings and figures, and to the accompanying descriptive matter, in which are illustrated exemplary embodiments of the present invention.

Apparatus for Treating Composite Surfaces for Bonding

Figure 1:
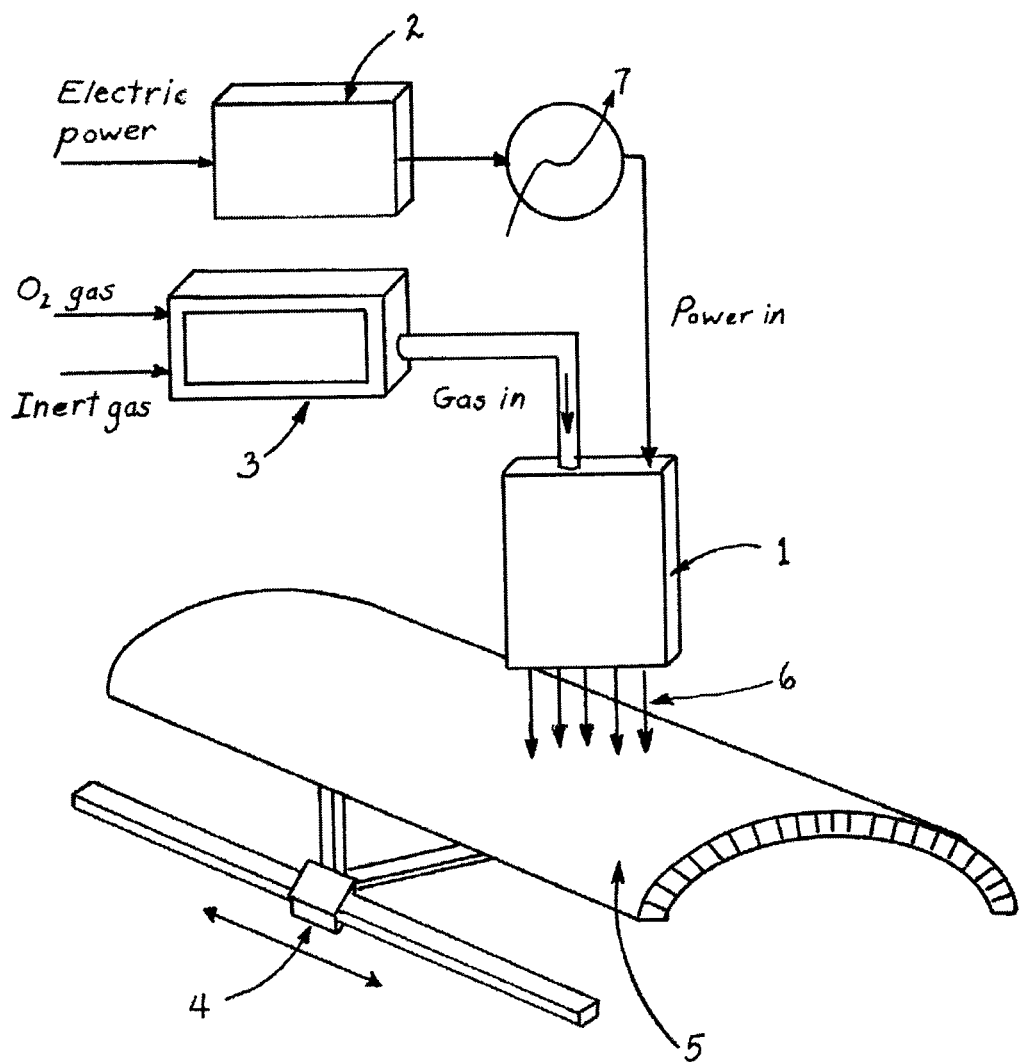
FIG. 1 is a schematic of an apparatus that may be used to perform an exemplary embodiment of the present invention.

An apparatus that may be used to practice an exemplary embodiment of the invention is illustrated in FIG. 1. The apparatus comprise a handheld or robot-held plasma device (1) that is connected to an electrical power supply (2), a means of supplying a gas flow (3) to the plasma device (1), and a means of translating (4) the composite substrate (5) underneath the reactive gas beam (6) generated by the plasma device (1). In FIG. 1, the power supply (2) is connected to an impedance matching network (7) so that the high-frequency power is properly coupled to the plasma device (1). Other power supply configurations may be used as will be understood by those skilled in the art. One example apparatus suitable for implementing embodiments of the invention is described in "Atmospheric Plasma Treatment of Polyetheretheretheretone Composites for Improved Adhesion," by Hicks et al., SAMPE Fall Technical Conference Proceedings: Global Advances in Materials and Process Engineering, Dallas, Tex., Nov. 6-9, 2006, CD-ROM, pp. 9, which is incorporated by reference herein. Other atmospheric pressure plasma delivery device may also be used provided that they project a suitable atmospheric plasma from a head that can be manipulated over a work piece.

Embodiments of the present invention are produced with an atmospheric pressure plasma delivery device (1) that projects the reactive gas beam (6) exterior to the device to from a head. The projected reactive gas beam and atmospheric plasma allow the application to composite work piece without the need of a vacuum chamber and on composite work piece that need not be small enough to pass through an fixed electrode gap as with the prior art. The head of the device (1) may comprise a plurality of holes to disperse the reactive gas beam (6), e.g. similar to a showerhead. Ideally, the device (1) may be portable and self-contain so that it can be easily manipulated to and used on a larger composite structure. Gas and power may be located remotely and coupled to the device (1) via flexible tubing and cables allowing the device (1) to be easily manipulated over the surface of the composite work piece (5).

The gas supplied to the plasma device (1) may include, but is not limited to, air, oxygen, carbon dioxide, a gas molecule containing one or more oxygen atoms, hydrogen, nitrogen, carbon tetrafluoride, sulfur hexafluoride, argon, helium, and mixtures thereof. Particularly effective gases are air, oxygen, air mixed with argon or helium, and oxygen mixed with argon or helium, such as an approximately 0.1 vol. % to 2 vol. % mixture of either oxygen or air in argon or helium at a total flow rate of approximately 30.0 L/min for the argon or helium. The apparatus is operated by flowing gas through the plasma device (1), and applying an electrical signal from the power supply (2) and matching network (7) to electrodes located in said device, such that the gas breaks down and becomes at least partially ionized. One or more composite work pieces (5) are then translated underneath the reactive gas beam (6) using a means for translation (4) for a period of time sufficient to activate their surfaces for bonding. Alternatively, one may hold the composite work piece (5) stationary and translate the plasma device (1) and reactive gas beam (6) over the surface. Following surface treatment, adhesive is applied to one of the surfaces of the composites, the composites are joined together, and the adhesive is cured to form a strong, permanent bond. Embodiments of the invention are further illustrated in the examples described hereafter.

Method for Bonding Composites

Example 1

Carbon-fiber-reinforced polyetheretherketone was obtained in order to demonstrate the improved method of bonding composites together. The PEEK composite included 0° laminates, containing 16 plies that were fabricated from unidirectional prepreg using IM7 or AS4 carbon fibers. The PEEK panels were cut into 1.0" by 6.0" strips. After plasma surface treatment, an epoxy film adhesive, 3M Scotch-Weld™ AF-563M, was used to bond the composites together. The film adhesive was 0.06 wt. and 10 mils thick.

The atmospheric pressure plasma device used to treat the PEEK contained a control unit that integrated together a radio frequency power supply operating at 13.56 MHz, a matching network, and a gas manifold with mass flow controllers that provided a mixture of 1.5 vol. % oxygen in helium at a flow rate of 30 L/min. The gas flow was directed through a cylindrical plasma device that was about 1.0 inch in diameter by 6.0 inches long. The device was configured with a gas inlet and a gas outlet that had many small holes creating a showerhead. In addition, the device contained electrodes connected to a radio frequency (RF) power supply that came into contact with the gas flowing through the device. Application of 100 W of RF power at 13.56 MHz to the device caused the gas to break down and form the low-temperature, atmospheric pressure plasma. Reactive species generated in the plasma flowed out through the showerhead and contacted PEEK composites that were placed a few millimeters downstream.

The 1.0" by 6.0" strips of PEEK were treated with the atmospheric pressure plasma for a specified period of time.

The film adhesive was applied to all but one inch of a given sample's length. Then two samples were joined and cured as follows: The specimen was clamped at ~30 psig, and placed in an evacuated oven for 20 min. After the vacuum was released, the oven was ramped at a rate of 5° F./min to 275° F., and held at 275° F. for 1.5 hr. Next, the samples were cooled back to room temperature, and then force apart with a wedge to examine the failure mechanism of the adhesive bond. The results of the wedge test are shown in Table 1. Composite samples that were only cleaned with methanol (run 1) exhibited adhesive failure, in which the epoxy glue sheared cleanly off of one of the surfaces of the PEEK specimens. By contrast, samples treated with the plasma at a distance of 2.0 mm and 100 W RF power (runs 4 and 5) exhibited 96 to 100° A cohesive failure for treatment times of 20.0 s per inch$^2$. Cohesive failure is characterized by shear occurring inside the cured epoxy such that a continuous film of glue remains adhered on both surfaces of the composite samples.

TABLE 1

Test conditions for the 0° PEEK and 3M AF 563M adhesive.

| Run # | Distance (mm) | Power (W) | Time (s/in$^2$) | Results |
|---|---|---|---|---|
| 1 | Methanol clean (control) | | | 0% cohesive failure |
| 2 | 2.0 | 100 | 10 | 25% cohesive failure |
| 3 | 2.0 | 100 | 15 | 90% cohesive failure |
| 4 | 2.0 | 100 | 20 | 100% cohesive failure |
| 5* | 2.0 | 100 | 20 | 96% cohesive failure |
| 6 | 5.0 | 100 | 20 | 20% cohesive failure |
| 7 | 5.0 | 100 | 40 | 90% cohesive failure |
| 8 | 5.0 | 100 | 60 | 80% cohesive failure |
| 9 | 5.0 | 100 | 90 | 100% cohesive failure |
| 10 | 10.0 | 100 | 20 | 0% cohesive failure |
| 11 | 10.0 | 100 | 40 | 25% cohesive failure |
| 12 | 10.0 | 100 | 60 | 30% cohesive failure |
| 13 | 10.0 | 100 | 90 | 60% cohesive failure |
| 14** | 2.0 | 125 | 7 | 100% cohesive failure |

*Waited 24 hours after plasma treatment before applying adhesive and curing.
**Argon and 1.2 Torr oxygen used instead of helium and 11.4 Torr oxygen.

The results presented in Table 1 show that longer treatment times are required to achieve cohesive failure if the plasma device is held further from the composite surface during treatment. For example, in run 9, 90.0 s per inch$^2$ of plasma treatment was needed to achieve 100% cohesive failure at a separation distance of 5.0 mm. This is most likely associated with a decline in the density of radical species in the plasma beam with distance from the device. In run 14, argon was fed to the plasma device instead of helium, and it was observed that only 7.0 s per inch$^2$ was needed to yield 100% cohesive failure of the bond. In this experiment, the distance between the plasma device and the sample was 2.0 mm, the RF power was 125 W, and the oxygen pressure was 1.2 Torr.

The treatment time with the reactive gas depends on the design of the plasma device and the conditions used to operate it. For example, a rectangular plasma device was used to treat PEEK that produced a plasma beam 2.0 inches in length by 1/16 inch in width. The device was operated at 30.0 L/min of helium flow, 1.5 L/min of oxygen flow, 225 W at 27.12 MHz, and a distance between the device and the sample of 1.0 cm. The plasma device was translated over two 1.0" by 7.0" strips of carbon-fiber-reinforced PEEK placed side by side at a rate of 5.0 s per inch. After treatment, 3M AF563 film adhesive was applied to one of the strips, the two samples were joined together, and the adhesive cured as described above. Once the samples had cooled back to room temperature, the two strips were forced apart with a wedge. Examination of the samples revealed that failure was 100% cohesive with a continuous film of epoxy remaining on both surfaces.

Example 2

Mechanical strength tests were performed on adhesively bonded strips of carbon-fiber-reinforced PEEK composites following the ASTM D1002 single-lap shear method and the ASTM D3165 double-notch lap shear method. For the ASTM D1002 test, PEEK panels, 6.0" by 7.0" were exposed to the plasma at 2.0 mm distance, using 100 W RF power, a mixture of 1.5 vol. % oxygen in helium at a flow rate of 30 L/min, and a treatment time of 30 s per inch$^2$. After treatment, 3M Scotch-Weld™ AF-563 film adhesive was applied to the end of a panel to yield a 0.6 inch overlap between the adherends. The adhesive was cured following the same procedure described in Example 1 above.

After curing, the 6.0" by 7.0" panels were cut into 1" wide strips and then pulled apart using an Instron machine that recorded the force required to shear the bond. It was found that the samples treated with the atmospheric pressure oxygen and helium plasma for 30 s/in$^2$ exhibited lap shear strengths of 6300±100 psi. This value is comparable to the maximum strength of the adhesive reported by the manufacturer, 3M. By contrast, PEEK samples that were cleaned with methylethylketone prior to bonding together with the epoxy yielded lap shear strengths of 3500±600 psi.

The double-notch lap shear tests, ASTM D3165, were performed with carbon-fiber-reinforced PEEK panels cut into 7.0"×6.0" rectangles. The panels were wiped with isopropyl alcohol and subjected to 30 s of plasma treatment at the standard process conditions, i.e., 2 mm between the device and the sample, 100 W RF power, and a treatment time of 30 s/in$^2$. After surface treatment, the 3M AF563M adhesive was applied to one panel and a second panel was placed on top. This sandwich structure was evacuated under a plastic covering, then inserted into an autoclave and pressurized from the top to 35 psig. Next, the temperature was ramped up at 5° F./min to 275° F. and held constant at 275° F. for 90 min. Each panel was cut into 1.0"×7.0" strips, notched on both sides to yield a 1.0" overlap region, and then tested on the Instron. Applying adhesive to PEEK that had been cleaned with isopropyl alcohol led to a shear strength of only 900±100 psi, and this specimen failed adhesively with the epoxy shearing off at one of the PEEK surfaces. By comparison, the samples treated with the atmospheric pressure plasma exhibited lap shear strengths of 5000±300 psi, and failed by a 100% cohesive mechanism.

The plasma treatment time needed to achieve high lap shear strength depends on the atmospheric pressure plasma device used and the process conditions. For example, the cylindrical plasma device, 1.0 in in diameter by 6.0 in. long, was operated at 30.0 L/min of helium flow, 1.5 L/min of oxygen flow, 180 W at 27.12 MHz, and a distance between the device and the sample of 1.0 cm. After treating each 7.0" by 6.0" PEEK panel with the plasma for 15 s per inch$^2$, the panels were bonded together with AF563 adhesive, cured as described above, cut into 1.0" by 7.0" strips, notched on both sides to provide a 1.0" overlap region, and sheared apart in the Instron. The lap shear strength measured in this test was 5700±340 psi.

Method of Bonding Composites on Aircraft

Figure 2:
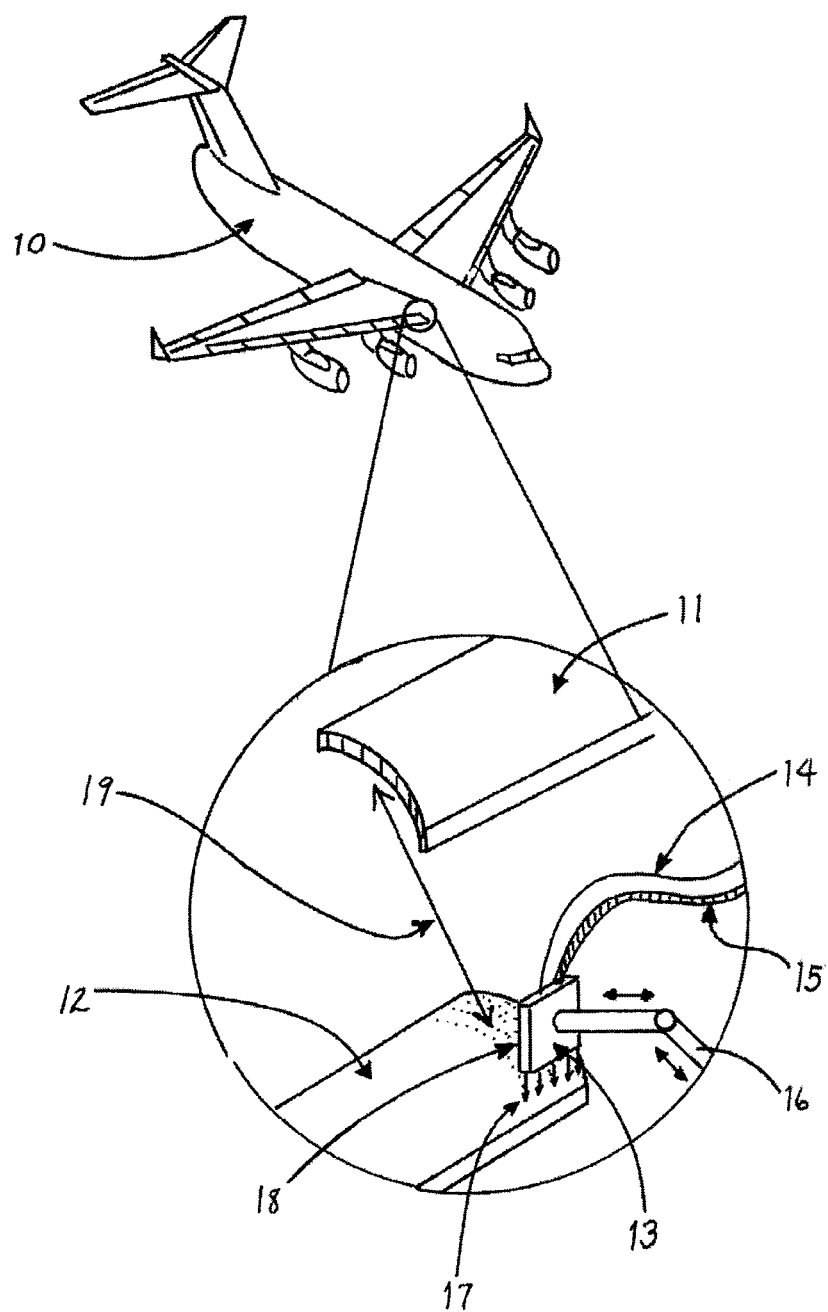
FIG. 2 is a schematic of an exemplary embodiment of the invention being applied to the assembly or repair of an aircraft.

Shown in FIG. 2 is an illustration of an exemplary embodiment of the present invention applied to the bonding of composites on aircraft, such as may be applied to any composite aerospace structure. For example, this could be performed where the wing struts are joined to the main body of the aircraft (10). An expanded view of the bonding operation is shown in FIG. 2. A composite part (12) is to be joined to another aircraft part (11). Part (12) is being treated with a self-contained atmospheric pressure plasma device (13) that is mounted on a robot arm (16). An oxygen-containing gas is supplied to the plasma device (13) through the flexible feed line (15). Electrical power is applied to the plasma device sufficient to break down the gas and at least partially ionize it using the electrical cable (14). The reactive gas beam (17) generated by the plasma contacts the surface of the composite part (12) projected from the head of the device (13) as shown. By using the robot arm (16) to sweep the reactive gas beam over the surface of the composite part (12), a region of the surface (18) becomes activated for adhesive bonding.

The next step may be to treat the other aircraft part (11) with the plasma device (13), although this step is not essential to carrying out this embodiment of the invention. After plasma treatment, adhesive would be applied to the activated surface (18) of the composite part (12). Then the aircraft parts (11) and (12) would be joined together and the adhesive cured following procedures that would be obvious to those skilled in the art.

Process Chart

Figure 3:
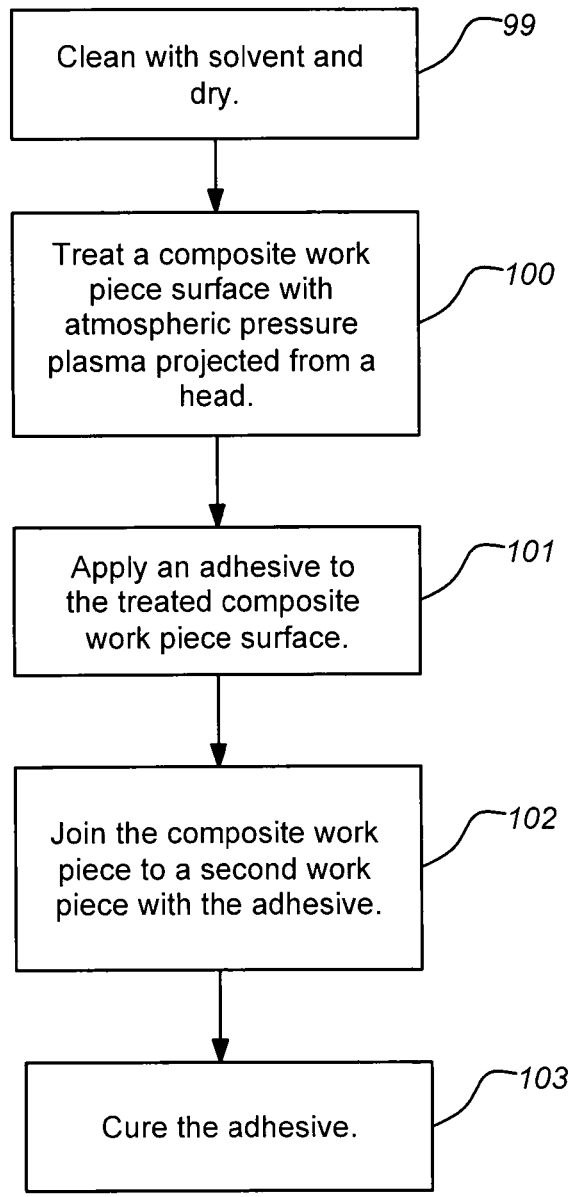
FIG. 3 is a block diagram of an exemplary embodiment of the present invention.

FIG. 3 is a flowchart illustrating the steps used in practicing the present invention. Block 100 illustrates the step of providing a surface treatment to at least one composite work piece surface utilizing an atmospheric pressure plasma device. A reactive gas beam is projected from the head of the atmospheric pressure plasma device. The device may be portable and self-contained such that it can be employed on large structures (e.g., aerospace structures) that cannot be easily manipulate and/or may not fit within a chamber. Prior to step 100, one may clean the surface with a suitable organic solvent and then dry the composite surface, as shown in block 99, although this step is not essential to practicing this embodiment of the invention. Block 101 illustrates the next step of applying an adhesive to the treated surface of at least one composite work piece. Block 102 illustrates the step of joining a second work piece, which may be a composite or other material such as metal or ceramic, to the composite work piece on which the adhesive has been applied. Block 103 illustrates the final step of curing the adhesive. (Curing is required, depending upon the selected adhesive, although better bonds are typically produced from curable adhesives.)

Embodiments of the invention may also be described as the resulting composite assembly from the bonding processes described. The joint between the composite work piece and the second work piece may include an atmospheric deposited species of the projected reactive gas beam. The composite assembly may be an aerospace structure assembled in an ambient environment. The resulting bonded composite from the novel process has a bond with a bond strength determined by cohesive failure.

CONCLUSIONS

Embodiments of the present invention describe a novel method of bonding composites to each other and to other materials in which a self-contained atmospheric pressure plasma device may be used to treat the surface of the composite prior to applying adhesive, then joining the materials together, and curing the adhesive. Embodiments of the invention have many advantages over the prior art: The atmospheric pressure plasma treatment can be applied to any composite material regardless of its composition, size or shape. The surface treatment is fast and effective, and adhesive bonds made to composites treated with the atmospheric pressure plasma are permanent and strong, with failure occurring within the adhesive and not at the interface between the adhesive and the composite. Embodiments of the present invention are particularly advantageous for adhesively bonding composites together in the assembly or repair of aircraft and other aerospace structures.

What is claimed is:

1. A method of bonding a composite, comprising:
   exposing a surface of a composite work piece to a reactive gas beam from a low-temperature, atmospheric pressure plasma delivery device;
   applying epoxy adhesive to at least a portion of the surface after exposure to the reactive gas beam; and
   joining the composite work piece to a second work piece with the applied epoxy adhesive;
   wherein the low-temperature, atmospheric pressure plasma delivery device generates the reactive gas beam by application of electrical power across at least a pair of electrodes in contact with approximately 0.1 vol. °A) to less than 2 vol. % mixture of either oxygen or air at atmospheric pressure flowing between the pair of electrodes to become the reactive gas beam and projects the reactive gas beam exterior to the low-temperature, atmospheric pressure plasma delivery device from a showerhead through a plurality of holes.

2. The method of claim 1, wherein the showerhead of the low-temperature, atmospheric pressure plasma delivery device is maneuverable to direct the reactive gas beam where desired.

3. The method of claim 2, wherein the composite work piece comprises an aerospace structure.

4. The method of claim 3, wherein at least one of the composite work piece and the second work piece comprises a damaged component of the aerospace structure.

5. The method of claim 2, wherein the showerhead of the low-temperature, atmospheric pressure plasma delivery device is translated over the composite work piece at a rate from 0.5 inches per minute to 1.0 foot per second to expose the surface to the reactive gas beam.

6. The method of claim 2, wherein the showerhead of the low-temperature, atmospheric pressure plasma delivery device is translated over the composite work piece by a robotic arm.

7. The method of claim 2, wherein the showerhead of the low-temperature, atmospheric pressure plasma delivery device is translated over the composite work piece by hand.

8. The method of claim 1, further comprising exposing a second surface of the second work piece to the projected reactive gas beam from the low-temperature, atmospheric pressure plasma delivery device before joining the composite work piece and the second work piece.

9. The method of claim 1, further comprising curing the epoxy adhesive to form a strong bond between the composite work piece and the second work piece.

10. The method of claim 1, further comprising cleaning the surface of the composite work piece with an organic solvent and drying prior to exposure with the reactive gas beam.

11. The method of claim 1, wherein the second work piece comprises a second material selected from the group consisting of a composite, a metal, and a ceramic.

12. The method of claim 1, wherein the low-temperature, atmospheric pressure plasma delivery device is portable and self-contained and the reactive gas beam is projected into an ambient atmospheric pressure environment.

13. The method of claim 1, wherein the electrical power is at least 50 W applied at a frequency selected from the group consisting of approximately 13.56 MHz and 27.12 MHz.

14. The method of claim 1, wherein the projected reactive gas beam comprises a reactive oxygen species.

15. The method of claim 1, wherein at least one of the composite work piece and the second work piece comprises a polymer selected from the group consisting of epoxy resin, polyester, phenolic resin, bismaleimide, polyimide, polyethersulfone, polyetherimide, polyetheretherketone, polyetherketoneketone; and a fiber reinforcement selected from the group consisting of carbon fibers and glass fibers.

* * * * *